Aug. 2, 1927.

G. C. CARHART 1,637,734

FRICTION CLUTCH

Filed June 1, 1921   2 Sheets-Sheet 1

George C. Carhart, INVENTOR.

BY Parsons & Bodell, ATTORNEYS.

Aug. 2, 1927.
G. C. CARHART
1,637,734
FRICTION CLUTCH
Filed June 1, 1921
2 Sheets-Sheet 2
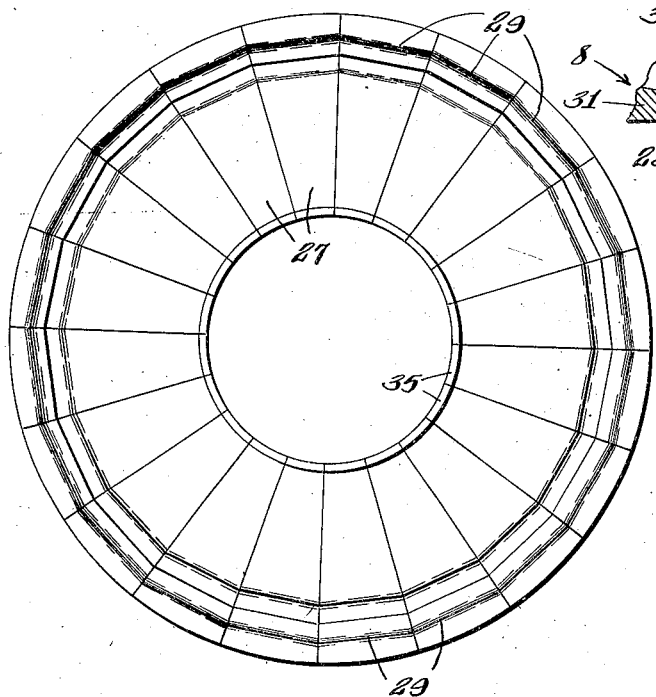
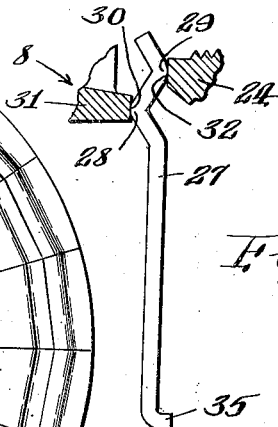
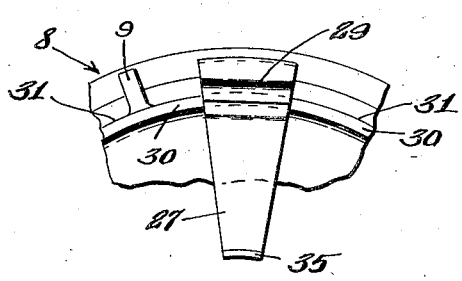
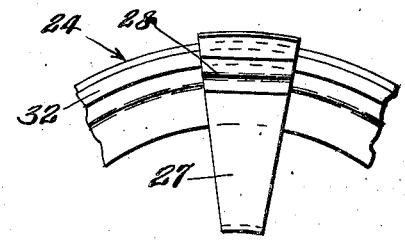
George C. Carhart, INVENTOR.
BY Parsons & Bidell, ATTORNEYS.

Patented Aug. 2, 1927.

1,637,734

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

FRICTION CLUTCH.

Application filed June 1, 1921. Serial No. 474,217.

This invention relates to friction clutches of the type used in motor vehicles, and has for its object a particularly simple, efficient and compact arrangement of the clutch mechanism whereby the clutch spring in addition to engaging the clutch also positively withdraws or disengages the clutch when the operating lever or foot pedal is depressed, and also particularly simple and efficient means for modifying and transmitting the power of the spring to the pressure element or ring to engage the clutch.

The invention consists in the novel features and in the combinations and constructions hereinafter set forth and claimed.

In describing this invention, reference is had to the accompanying drawings in which like characters designate corresponding parts in all the views.

Figure 2 is a rear elevation of the levers for transmitting the motion of the clutch spring to the pressure ring.

Figure 3 is an enlarged edge view of one of the levers and contiguous parts of the pressure ring and the fulcrum ring.

Figure 4 is an enlarged face view of such lever, the contiguous portion of the pressure ring being shown.

Figure 5 is an opposite face view, the contiguous portion of the fulcrum being shown.

Figure 1:
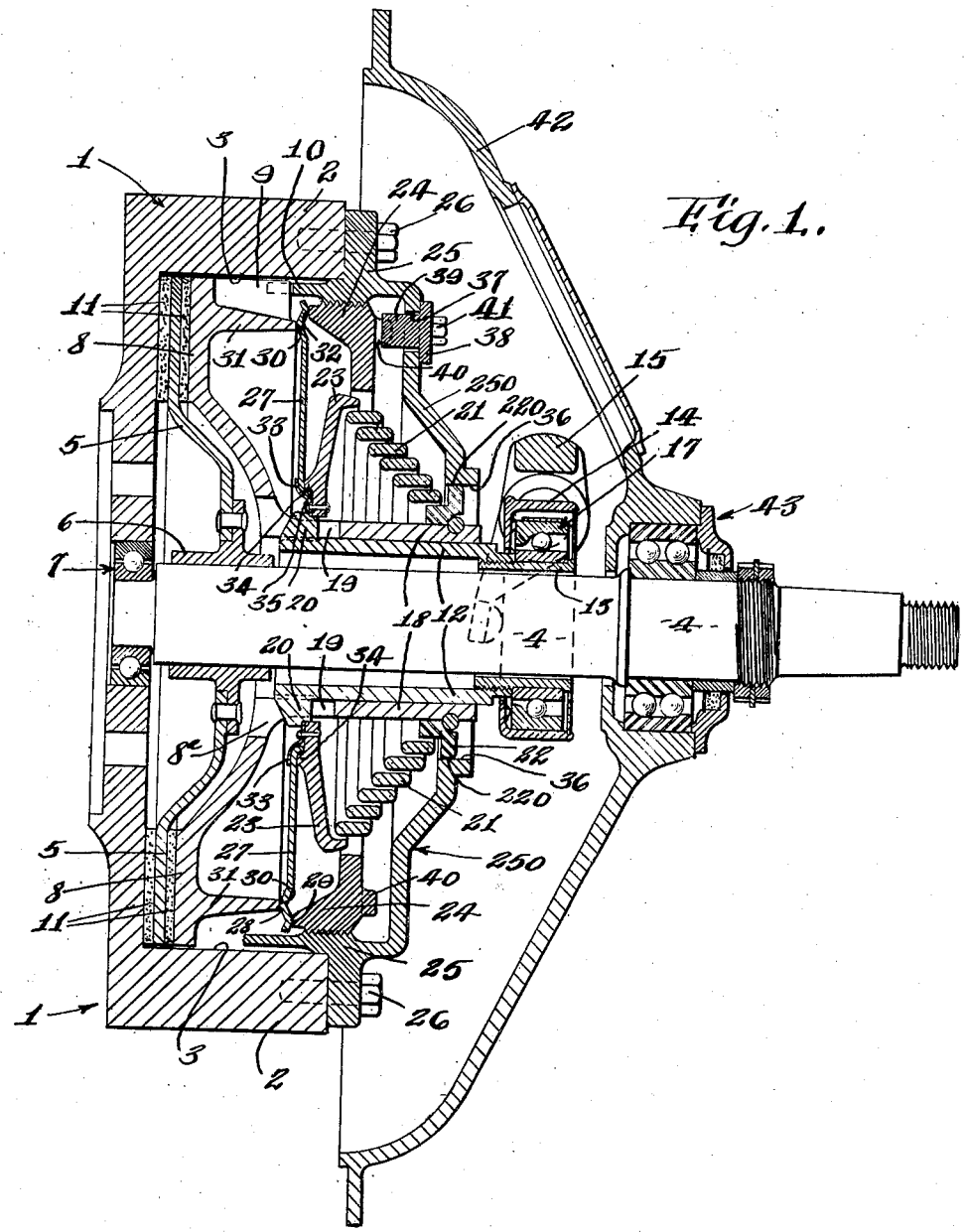
Figure 1 is a vertical sectional view, partly in elevation, of a clutch embodying my invention.

This clutch comprises generally, an axially shiftable pressure member for engaging the clutch, spring means acting unequally in opposite directions on the pressure member to engage the clutch and to withdrawn the pressure member to disengage the clutch, and an operating member for controlling the action of the spring means. More specifically, the clutch includes driving and driven elements, a pressure member or ring rotatable with and shiftable axially of one of said elements as the driving element, the other element as the driven element including a shaft arranged coaxially with the driving element, and the pressure member or ring, a friction plate rotatable with the shaft and extending between the opposing faces of the pressure ring and the element, as a driving element, with which the ring is associated, an operating member shiftable axially of the shaft, a spring controlled by the operating member and thrusting in opposite directions against the pressure ring, and motion transmitting means through which the power of the spring is transferred to the pressure ring in one direction to engage the clutch with a greater effect than when the power of the spring is transferred in the opposite direction to disengage the clutch.

My invention is here shown as embodied in a single plate clutch, but obviously it may be employed in other types of clutches.

1 designates the driving element which is here shown as discoidal in general form and as having an annular flange 2 which encloses a cylindrical recess 3. The driving element is usually the fly wheel of an internal combustion engine.

5 is a friction plate carried by a hub 6 secured to the shaft 4 to rotate therewith. The shaft 4 is arranged substantially coaxial with the driving element and may have a pilot bearing 7 in the driving element.

8 is the pressure member or ring located in the recess 3 and secured to the driving element to rotate therewith and slide axially thereof and of the shaft 4. As here illustrated, the pressure element slidably fits the annular wall of the recess 3, and in the illustrated construction is connected to the driving element by means of lugs 9 on the rear side of the pressure member or ring and interlocking with the driving element or a part fixed thereto as with arms or a flange 10 with notches therein provided on the cover plate attached to the edge of the flange 2 as hereinafter described.

The plate 5 of the driven element extends between the ring 8 and the opposing face of the driving element 1. Preferably, wearing plates or friction disks as 11 are arranged on opposite sides of the plate 5.

The operating means for the pressure ring comprises an operating member, a clutch spring controlled by the operating member, and means for transferring the movement or power of the spring to the pressure ring, the spring being controlled by the operating member.

12 is the operating member, it being here shown as a sleeve encircling the shaft 4 and slidable in the hub to be described, of the pressure ring 8. 13 is a collar at the rear end of the sleeve 12, said collar 13 being encircled by the collar 14 which coacts with the yoke or fork 15 of a rock shaft to which the clutch pedal is connected. A suitable antifriction bearing 17 is interposed between the collars 13 and 14.

The pressure member or ring 8 is shown as provided with a web or spokes 8ᵃ, and with a hub 18 in which the operating sleeve 12 is slidable. The hub 18 is supported at its rear end in the cover plate to be described. As the cover plate is carried by the driving element and as the pressure ring slidably engages the wall of the recess 3 in the driving element, the pressure ring is supported by the driving element at spaced apart points that is, its front and rear ends and held in alignment therewith. Also, the operating sleeve 12 is carried by this hub and in alinement therewith so that there is no wear between the sleeve and the shaft 4 of the driven element.

The hub 18 is here shown as provided with lengthwise slots 19 near its front end and the sleeve 12 as being provided with radially extending shoulders 20 extending through the slots and projecting beyond the periphery of the hub.

21 designates the clutch spring arranged to transmit power unequally in opposite directions to the pressure element 8 to engage the clutch, that is, to press the member or ring to the left, Fig. 1 to compress the friction plate 5 against the opposing face of the driving element 1, and in the opposite direction to withdraw the pressure member or ring 8 to the right to release the clutch when the clutch pedal is depressed. As here shown, the spring is conical in form and the coils at its small or rear end thrust against a collar or spring abutment 22 mounted directly on the rear end of the hub 18 of the pressure ring 8 and the coils at its front or larger end thrust against the spring abutment 23 which in turn thrusts against the shoulders 20. The abutment 22 is secured to the hub 18 in any suitable manner and has a peripheral bearing surface 220.

The motion transmitting means for transmitting and modifying the motion of the spring to the pressure element 8 to engage the clutch, comprises a plurality of levers extending outwardly relatively to the axis of the clutch and engaging at their inner ends with the spring abutment 23 and coacting at spaced apart points in radial directions with the pressure ring 8 and a fulcrum member 24 associated with the driving element.

This fulcrum member is here shown as an annular ring threading in an internally threaded ring 25 which is preferably formed integral with a cover plate 250 previously referred to, secured in any suitable manner as by screws 26 to the driving element, in the rear of the pressure ring 8.

The levers 27 are preferably segments of a discoidal plate and are usually arranged with their side edges engaged with each other. Said levers coact at their inner ends with the spring abutment 23, at their outer ends with the fulcrum member 24 and transmit the power to the ring 8 between their inner and outer ends but near their outer ends. The construction of the levers as thus far described, forms no part of this invention.

Each lever or segment 27 is formed on its front and rear faces with projections 28 and 29 which extend in a straight transverse line, that is, in different chords of the arc of the circle of the discoidal plate of which the levers are segments. The projection 28 coacts with an annular bearing face 30 on the rear side of the pressure ring 8, and as here shown, as at the rear edge of an annular flange 31 on the rear side of the ring 8; and the projections 29 coact with an annular face 32 on the front side of the fulcrum member 24. These projections, as best seen in Fig. 3, are preferably provided by forming the lever 27 with transverse corrugations, the apices of which extend in straight lines which are chords of different arcs of the circle of the plate of which the levers are segments. By reason of these projections 28, 29 the arms of the lever do not vary in length during the operation of the lever. That is the lever arm between the fulcrums 28 and 29 does not vary and also the arm of the lever between the fulcrum 28 and the point 34 does not vary as they would if the levers were unprovided with the straight projections 28, 29 or if they were flat or if provided with arc shaped projections for coacting with the faces 30 and 32 of the pressure ring 8 and the fulcrum 24. Obviously, as the projections 28 and 29 are straight and at a right angle to the radius of each lever, they will coact with the fulcrums 30 and 32 without changing the leverage as they have a bearing along chords of the arcs of the surfaces 30 and 32, while if these levers were flat or not provided with the straight projections 28 and 29, the flat surfaces of the levers in coacting with, or bearing on arc shaped portions of the surfaces 30 and 32 would vary their leverage, as at the start of the pressure applying operation the levers would bear on the surfaces 30 and 32 along chords of the arcs of the surfaces 30 and 32, which chords would be equal to the width of the lever and during the pressure applying operation the levers would vary and at the end bear on the surfaces 30 and 32 at the middle of such arcs only and hence the leverage of the levers would vary during the pressure applying operation an amount depending upon the altitude of the arc of the surfaces 30 and 32 or a distance equal to a line drawn from the center of the chord of the arc to the highest point of the arc. By forming the levers 27 with straight projections 28 and 29, the leverage or fulcrum points do not vary during the pressure applying operation. The inner ends of the levers 27 extend into a channel formed on the front side of the spring abutment 23, this channel being formed by securing, preferably, a more or less resilient ring or annular strip 33 to the spring abutment 23.

The entrance to the channel is contracted by an annular flange 34 on the spring abutment 23 and the inner ends of the levers 27 are formed with hooks or flanges 35 which extend under or interlock with the flange 34.

The cover plate 250 which is virtually an extension of the ring 25 is provided with a hub or bearing 36 which coacts with the peripheral surface 220 of the collar or spring abutment 22 on the hub 18 of the pressure ring 8 whereby the pressure ring and operating sleeve 12 in the hub 18 are held substantially concentric with the driving element at spaced apart points as the front and rear ends of the pressure ring 8 as previously mentioned. The cover plate is provided with a suitable opening 37 through which the ring 24 may be adjusted to take up looseness and wear, and this opening has a suitable closure 38 having a shoulder 39 therein coacting with any one of a series of shoulders 40 on the fulcrum ring 24 to hold the fulcrum in its adjusted position. Oil if used, may be placed in the clutch through the opening 37. The closure 38 may be held in its adjusted position by suitable means as screws 41. Owing to the arrangement of the spring 21, spring abutments 22, 23 on the hub of the pressure ring 8, the levers 27 and fulcrum 24, back plate 250, these parts are removable and replaceable as a unit without releasing the tension of the spring 21. After being removed the unit can be placed or clamped in a suitable machine tool for the purpose of disassembling. Also the parts can be readily assembled as a unit. The removability of the back plate 250 and the fulcrum ring 24 therewith facilitates the removability of the pressure ring, main spring and levers 27 as a unit.

In operation, the spring 21 thrusts unequally in opposite directions against the pressure member or ring 8 but it thrusts directly against the member 8 in one direction as to the right, Fig. 1 and indirectly through the motion transmitting and modifying levers 27 in the opposite direction, and as the levers fulcrum at points outside of the pressure ring 8, the power of the spring is not neutralized, but is transferred with greater effect through the levers 27 to the pressure ring 8 than directly thereto through the spring abutment 22. When the clutch pedal is depressed to move the operating member or sleeve 12 to the right, Fig. 1, the shoulders 20 on the sleeve 12 press the spring abutment 23 to the right, Fig. 1, and thus release the clutch. Owing to the levers 27, the motion of the large end of the spring 21 and the spring abutment 23 is several times greater than the movement of the pressure ring or member 8. Upon depression of the clutch pedal, the member 8 is relieved of the pressure of the spring through the levers 27 and the spring thrusts against the collar 22 with full effect and withdraws the pressure ring 8 to disengage the clutch. The spring 21 thus acts substantially the same as two springs acting in opposite directions, one of which is stronger than the other.

As will be understood by those skilled in the art, the clutch is enclosed in a suitable housing 42 which is secured at its margins to the housing or crank casing of the engine, this housing having a bearing 43 on the shaft 4 and also supporting the shifting fork or yoke 15.

What I claim is:

1. In a clutch, the combination of driving and driven elements, a pressure ring rotatable with and shiftable axially of one of said elements, the other element including a shaft arranged substantially coaxially with the former element and the pressure ring, a friction plate rotatable with the shaft and extending between the ring and the opposing surface of the element with which the ring is associated, the pressure ring having a hub mounted concentric with and spaced apart from the shaft and having a spring abutment fixed relatively thereto, near its rear end, an operating member slidable in the hub, a second spring abutment slidable on the hub, the second spring abutment and the operating member having shoulders whereby the second spring abutment thrusts against said shoulders, a spring interposed between the spring abutments, and motion transmitting means including levers between the second spring abutment and the pressure ring, substantially as and for the purpose set forth.

2. In a clutch, the combination of driving and driven elements, a pressure ring rotatable with and shiftable axially of one of said elements, the other element including a shaft arranged coaxially with the former element and the pressure ring, a friction plate rotatable with the shaft and extending between the ring and the opposing surface of the element with which the ring is associated, the pressure ring having a hub mounted concentric with the shaft and spaced therefrom and having a spring abutment fixed relatively thereto near its rear end, an operating member slidable in the hub, the hub being formed into lengthwise slots and the operating member having shoulders extending through said slots, a second spring abutment slidable on the hub and thrusting against the shoulders, a spring interposed between the spring abutments, and motion transmitting levers between the second spring abutment and the pressure ring, substantially as and for the purpose set forth.

3. In a clutch the combination of driving and driven elements, one of said elements being formed with an axial recess, a pressure ring rotatable with and shiftable axially of the element formed with the recess, and being located in said recess, and the other element including a shaft arranged substantially coaxially of said recess and the pressure ring, a friction plate rotatable with the shaft and extending between the pressure ring and the bottom of the recess, a fulcrum member carried by the element formed with a recess and located in the rear of the ring and at the rear end of said recess, and being opposed to such ring, the pressure ring having a hub arranged concentric with and spaced apart from the shaft and formed with a spring abutment at its rear end, and operating means extending lengthwise of the hub within the same, and having a shoulder opposed to the spring abutment, a second spring abutment thrusting against the shoulder, a spring interposed between the spring abutments and motion transmitting levers between the second spring abutment and the pressure ring and coacting with the fulcrum member, said fulcrum member being removable, whereby the pressure ring with the spring thereon and the levers are removable as a unit out of the rear end of the recess and are replaceable therein as a unit.

4. In a clutch the combination of driving and driven elements, one of which is formed with a cylindrical recess, a pressure ring rotatable with and shiftable axially of the element formed with the recess, and being located in such recess, and the other element including a shaft arranged substantially coaxially with the former element and the pressure ring, a friction plate rotatable with the shaft and extending between the pressure ring and the bottom of the recess, a removable plate at the rear end of the recess, and having an opening through which the shaft extends, the pressure ring having a hub concentric with the shaft and spaced apart therefrom, and formed with a spring abutment, an operating member shiftable axially of said hub and having a shoulder opposed and spaced from said spring abutment, a second spring abutment thrusting against said shoulder, a spring interposed between the spring abutments and motion transmitting means between the second spring abutment and the pressure ring, the second named plate being removable, whereby the pressure ring, the spring and motion transmitting means are removable and replaceable as a unit through the rear end of the recess.

5. In a clutch, the combination of driving and driven elements, one being formed with an axial recess, a pressure ring rotatable with and shiftable axially of said element, and being located in the recess, and the other element including a shaft arranged substantially coaxially with the former element and the pressure ring, means rigid with the pressure ring, opposing spring abutments in surrounding relation to said rigid means, one of which is movable toward and from the other, a spring interposed between the abutments and motion transmitting means between the movable abutment and the pressure ring, the spring and motion transmitting means being self-contained with the pressure ring, whereby the pressure ring and associated parts are removable and replaceable as a unit into and out of the recess through the rear end thereof, without affecting the tension of the spring, and operating means for coacting with one of the spring abutments.

6. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and operating means shiftable in a direction axially of the shaft, of an annular fulcrum carried by and rotatable with the element with which the pressure ring is associated and being opposed to the pressure ring, a series of levers between the operating means and the ring, the levers engaging the pressure ring and the fulcrum, each of said levers being formed with a transverse corrugation having its apex extending in a substantially straight line and bearing on the rear face of the pressure ring, substantially as and for the purpose described.

7. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and operating means shiftable in a direction axially of the shaft, of an annular fulcrum carried by and rotatable with the element with which the pressure ring is associated and being opposed to the pressure ring, and a series of motion transmitting levers beween the operating means and the ring, the levers engaging the pressure ring and the fulcrum, each lever being formed with a transverse corrugation having its apex extending in a substantially straight line and coacting with the fulcrum, substantially as and for the purpose described.

8. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and operating means shiftable in a direction axially of the shaft, of an annular fulcrum carried by and rotatable with the element with which the pressure ring is associated and being opposed to the pressure ring, and a series of levers between the operating means and the ring, the levers engaging the pressure ring and the fulcrum, each lever having a transverse corrugation projecting on each side thereof, the apices of the corrugations extending in substantially straight lines and engaging the rear face of the pressure ring and the opposing face of the fulcrum, substantially as and for the purpose specified.

9. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and operating means shiftable in a direction axially of the shaft; of an annular fulcrum carried by and rotatable with the element with which the pressure ring is associated and being opposed to the pressure ring, and a series of levers between the operating means and the ring, the levers engaging the pressure ring and the fulcrum, each lever having substantially flat faces opposed to the pressure ring and the fulcrum, and a transverse projection from the face opposed to the pressure ring having its edge extending in a substantially straight line and bearing against the pressure ring, substantially as and for the purpose set forth.

10. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and operating means shiftable in a direction axially of the shaft; of an annular fulcrum carried by and rotatable with the element with which the pressure ring is associated and being opposed to the pressure ring, and a series of levers between the operating means and the ring, the levers engaging the pressure ring and the fulcrum, each lever having a flat face opposed to the fulcrum and a transverse projection from the flat face opposed to the fulcrum, and extending in a substantially straight line and engaging the fulcrum, substantially as and for the purpose described.

11. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated and operating means shiftable in a direction axially of the shaft; of an annular fulcrum carried by and rotatable with the element with which the pressure ring is associated and being opposed to the pressure ring, and a series of levers between the operating means and a ring, the levers engaging the pressure ring and the fulcrum, each lever having flat faces on opposite sides thereof, opposed to the pressure ring and the fulcrum, and a projection from each flat face, the projections extending in substantially straight lines and engaging respectively with the pressure ring and the fulcrum, substantially as and for the purpose specified.

12. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and operating means shiftable in a direction axially of the shaft; of an annular fulcrum carried by and rotatable with the element with which the pressure ring is associated and being opposed to the pressure ring, and a series of levers between the operating means and the ring, the levers engaging the pressure ring and the fulcrum, the levers being segments of a discoidal plate and each lever having a transverse projection on one side thereof extending along a chord of the arc of the circle of the discoidal plate of which the lever is a segment, the projections coacting with the fulcrum, substantially as and for the purpose set forth.

13. In a clutch, the combination with driving and driven elements, a pressure ring rotatable with and shiftable axially of one of said elements, the other of said elements including a shaft, and a friction plate rotatable with the shaft and extending between the pressure ring and the opposing surface of the element with which the ring is associated, and operating means shiftable in a direction axially of the shaft; of an annular fulcrum carried by and rotatable with the element with which the pressure ring is associated and being opposed to the pressure ring, and a series of levers between the operating means and the ring, the levers engaging the pressure ring and the fulcrum, the levers being segments of a discoidal plate and each lever being formed with projections on each of its sides, which projections extend along chords of different arcs of the circle of the discoidal plate, the projections engaging respectively with the pressure ring and the fulcrum, substantially as and for the purpose described.

14. In a clutch, the combination of driving and driven elements, a pressure ring rotatable with and shiftable axially of one of said elements, the other element including a shaft, a friction plate rotatable with the shaft and extending between the pressure ring and the opposing end surface of the element with which the ring is associated, and operating means shiftable in a direction axially of the shaft; of an annular fulcrum carried by the element with which the pressure ring is associated in the rear of the ring, and motion transmitting levers between the operating means and the ring, the pressure ring and the fulcrum having annular bearing surfaces on their opposite faces, said levers being segments of a discoidal plate and coacting at their inner ends with said operating means and near their outer ends at spaced apart points in radial directions, with the annular surfaces of the pressure ring and the fulcrum, the segments being provided on opposite sides thereof with transverse projections extending along chords of different arcs of the circle of the discoidal plate and engaging respectively with said annular bearing faces, substantially as and for the purpose specified.

15. In a clutch the combination of driving and driven elements, a pressure ring rotatable with and shiftable axially of one of said elements, the other of said elements including a shaft arranged substantially coaxially with the former element and the pressure ring, a friction plate rotatable with the shaft and extending between the ring and the opposing surface of the element with which the ring is associated, the pressure ring having a sleeve arranged concentric with and spaced apart from the shaft, and formed with lengthwise slots at the inner end of the sleeve, an operating member movable along the shaft and within the sleeve, and having shoulders extending through said slots above the periphery of the sleeve, a spring abutment thrusting against said shoulders, and a second spring abutment on the sleeve, a spring between the abutments, and motion transmitting means between the first spring abutment and the pressure ring.

16. In a clutch, the combination of driving and driven elements, a pressure ring rotatable with and shiftable axially of one of said elements, the other of said elements including a shaft arranged coaxially with the former element and the pressure ring, and a friction plate rotatable with the shaft and extending between the ring and an opposing surface of the element with which the ring is associated, the pressure ring having a hub arranged concentric with and spaced apart from the shaft, and the pressure ring and its hub having peripheral bearings at spaced apart points in a direction lengthwise of the shaft on the element with which the ring is associated, an operating member slidable in the hub, a clutch spring acting on the operating member, and motion transmitting means between the operating member and the pressure ring, substantially as and for the purpose described.

17. In a clutch, the combination of driving and driven elements, one of said elements being formed with a recess and provided with a cover plate for the recess rotatable therewith, the cover plate having a central opening, a pressure ring rotatable with and shiftable axially of said element and having peripheral bearings on the walls of the recess and on the walls of the central opening of the cover plate, the other of said elements including a shaft arranged coaxially with the former element and said pressure ring, and a friction plate rotatable with the shaft and extending between the ring and the opposing surface of the element with which the ring is associated, an operating member slidable in the hub of the pressure ring, a spring abutment encircling the hub and thrusting against the operating member, a spring encircling the hub and thrusting against said abutment, and motion transmitting means between the abutment and the pressure ring, substantially as and for the purpose set forth.

18. In clutch mechanism, the combination of a clutch casing member having a friction surface, a clutch plate engageable with said surface, a thrust ring slidable relatively to said casing, levers fulcrumed loosely at their outer ends on said casing, lever-actuating means with which said levers engage loosely at their inner ends, said levers engaging said ring intermediate their ends, and spring means arranged to exert pressure between said lever-actuating means and said ring and operative to force said ring and plate toward said surface.

19. In a plate clutch, the combination of a driving member, a driven plate, a thrust ring carried by said member, said plate positioned between said ring and member, and means for forcing said ring and plate toward said member comprising levers fulcrumed at their outer ends upon said member and acting intermediate their ends against said ring, and spring means carried by said ring and operative upon the inner ends of said levers.

In testimony whereof, I have hereunto signed my name, at Syracuse, in the county of Onondaga and State of New York this 20th day of May, 1921.

GEORGE C. CARHART.